No. 723,670. PATENTED MAR. 24, 1903.
C. B. & C. T. HIXSON.
GRAIN SEPARATOR.
APPLICATION FILED MAY 31, 1901.
NO MODEL. 2 SHEETS—SHEET 1.
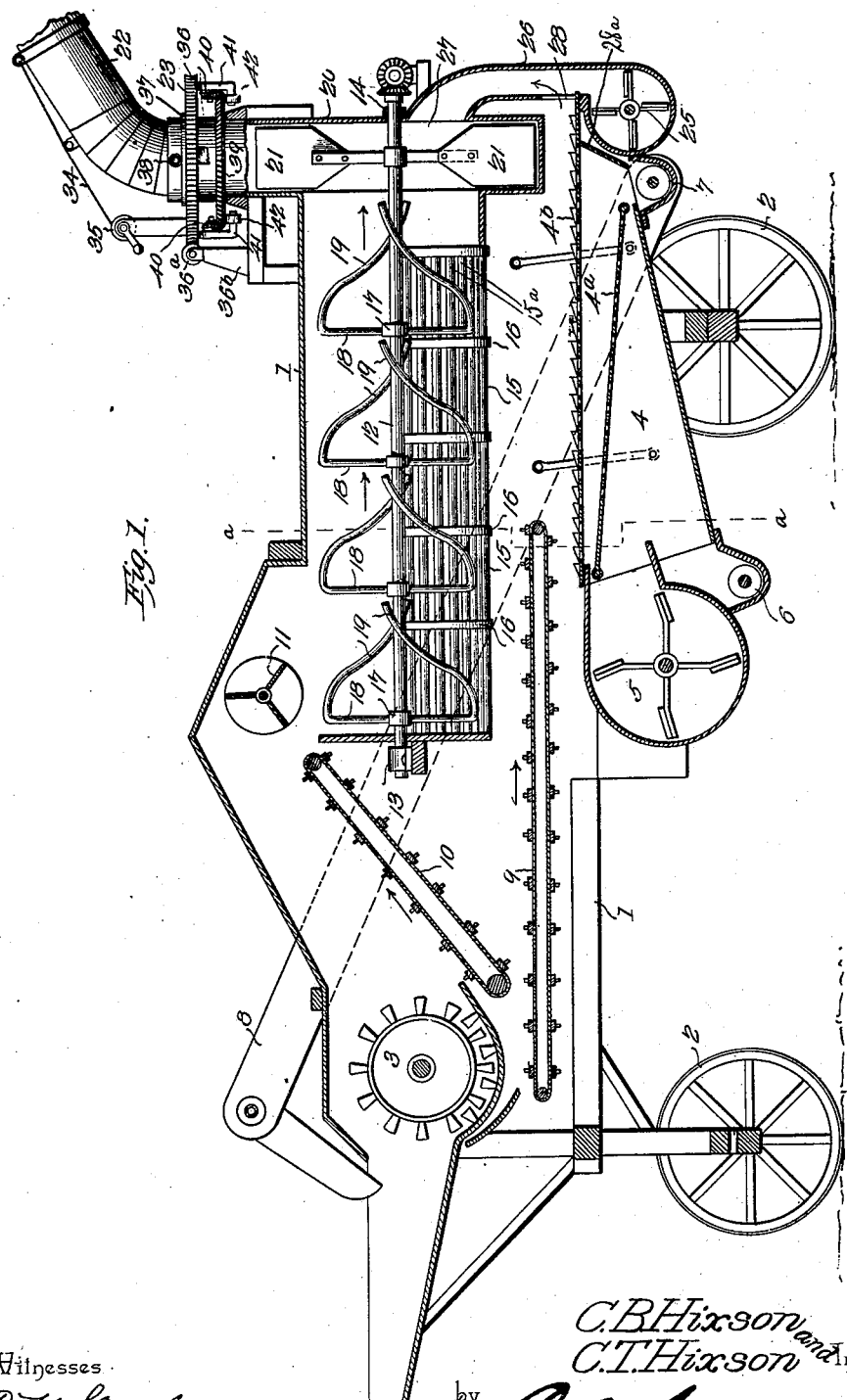

No. 723,670. PATENTED MAR. 24, 1903.
C. B. & C. T. HIXSON.
GRAIN SEPARATOR.
APPLICATION FILED MAY 31, 1901.
NO MODEL. 2 SHEETS—SHEET 2.
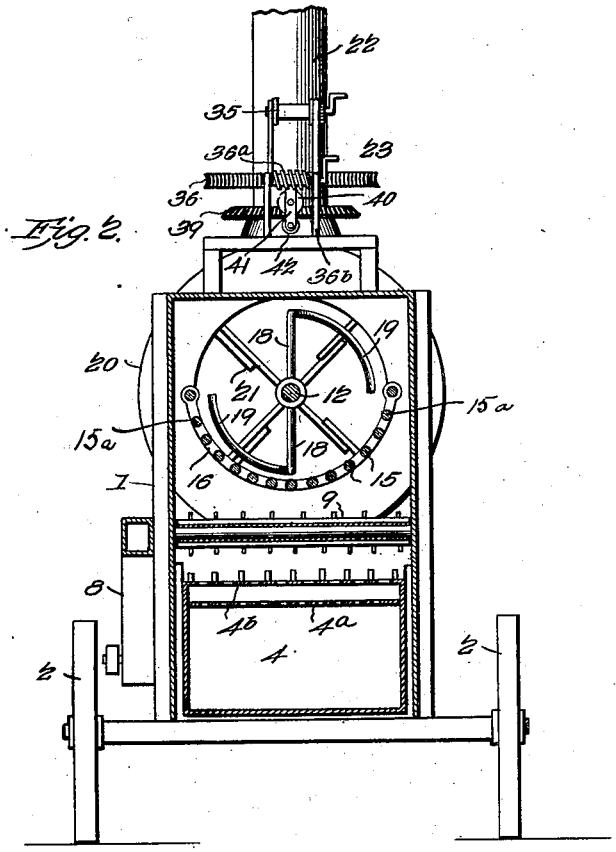
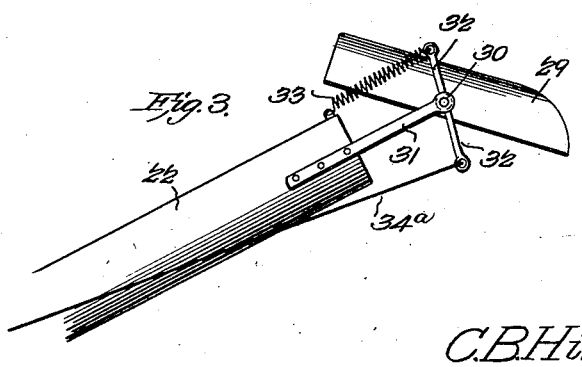
Witnesses
E. T. Stewart
C. N. Woodward
C. B. Hixson and
C. T. Hixson Inventors
by C. A. Snow & Co.
Attorneys

UNITED STATES PATENT OFFICE.

CLARENCE B. HIXSON AND CHARLES T. HIXSON, OF HOLT, OKLAHOMA TERRITORY.

GRAIN-SEPARATOR.

SPECIFICATION forming part of Letters Patent No. 723,670, dated March 24, 1903.

Application filed May 31, 1901. Serial No. 62,625. (No model.)

*To all whom it may concern:*

Be it known that we, CLARENCE B. HIXSON and CHARLES T. HIXSON, citizens of the United States, residing at Holt, in the county of Woods and Territory of Oklahoma, have invented a new and useful Grain-Separator, of which the following is a specification.

This invention relates to grain-separators or threshing-machines; and it consists in the construction, combination, and arrangement of parts, as hereinafter shown and described, and specifically pointed out in the claims.

In the drawings illustrative of the invention, Figure 1 is a longitudinal sectional elevation. Fig. 2 is a transverse section on the line $a\ a$ of Fig. 1 looking toward the "tail" or discharge end of the machine. Fig. 3 is a detail of the outer or discharge end of the pneumatic stacker.

The main frame 1 of the machine, together with the carrying-wheels 2, cylinder 3, shoe of riddles 4, fan 5, screw conveyers 6 and 7, "repeat-elevator" 8, straw and chaff belt 9 are of the usual construction except for such modifications as may be necessary to adapt the improvements which we have made to the devices above enumerated.

Rising at an incline from a point just in the rear of the cylinder 3 is an endless slatted belt 10, and at the discharge or upper end of this belt is mounted a revoluble beater 11, which is adapted to "break" the straw downward as it passes over the belt.

12 is a shaft mounted longitudinally of the machine in bearings 13 14 and extending from a point beneath the discharge end of the belt 10 to the rear or tail end of the machine and adapted to be rapidly revolved in any manner from the driving mechanism of the machine. Beneath the shaft 12 is a semicylindrical slatted screen 15, preferably formed of longitudinal slats $15^a$, spaced apart and supported at suitable intervals by curved bars 16. The curved screen 15 may be formed in one continuous structure or in sections, as may be preferred.

Attached to the shaft 12 at suitable intervals are a series of hubs 17, each carrying arms 18, projecting at right angles to the shaft and extending nearly to the screen 15. Each of the arms 18 is provided with a curved extension 19, each extension being in a compound curve, one curve conforming to the circumference of the semicylindrical screen 15, as shown in Fig. 2, and the other curve trending toward the tail end of the machine, as shown in Fig. 1, so that when a series of these doubly-curved arms are assembled upon the shaft they combine to form a screw-conveyer-like structure, while at the same time serving as beaters. Thus the broken straw and chaff being fed into the screen 15 over the belt 10 is caught by the rapidly-revolving curved arms, which by their beater action thoroughly agitate the straw and separate the chaff and grain from the straw and allow it to pass between the bars of the screen 15, while the straw is carried outward by the screw or conveyer action of the curved beaters. Thus the curved arms 19 act in a double capacity as beaters to separate the chaff and grain from the straw and also to feed the straw along the curved slatted screen and discharge it over the tail.

The screen 15 is arranged to discharge into a large fan-case 20, the blades 21 of this fan being shown mounted upon the shaft 12 and the fan-case discharging into a tubular discharge-tube 22, which, together with the fan, constitutes a "wind-stacker." The tube 22 is arranged to be adjusted by its lower end by a system of gearing 23, by which the discharge end of the stacker-tube may be turned in any required direction.

The material passing between the bars of screen 15 is conducted to the chaff-conveyer and riddle-shoe, where it is separated in the usual manner and the finished product discharged by the screw conveyer 6 and the tailings from the screen $4^a$ carried by the screw conveyer 7 and elevator 8 back to the feed-table in the usual manner.

25 is a smaller fan arranged with a vertical wind-trunk 26, discharging into the fan-casing 20 at 27, and with an inlet 28 in the wind-trunk 26, adapted to receive the tailings from the chaff-screen $4^b$ of the shoe 4, the function of this fan being to receive the tailings from the chaff-screen and carry them into the fan 27, so that they will be carried off into the stacker. By this means all the invaluable material, such as straw and chaff, both from the separator and from the fanning-mill or shoe part of the machine, is conducted into the stacker, so that all of the refuse matter is conveyed to one point by the stacker. This is a very important feature of our invention and effectually prevents the annoyance heretofore experienced from the blowing of the chaff and dust out through the open tail end of the shoe.

The shoe is shown provided with a "tailboard" 28ª, adapted to turn the lighter particles blown off by the fan 5 upward, so that they will pass through the chaff-screen and be brought into the influence of the suction of the fan 25, together with chaff from the screen 4ᵇ. By this simple arrangement the threshed straw, grain, and chaff are all fed over the tail of the belt 10, where the straw is subjected to the action of the breaker-beater 11, which breaks it down and greatly assists in separating the particles, so that it enters the inner end of the screen 15 in the best possible condition to be acted upon by the separating mechanism.

The rapidly-revolving arms 19 thoroughly agitate the material and separate the chaff and grain from the straw and carry the straw along the screen and discharge it into the fan-casing 20, while the chaff and separated and partially-separated grain fall through the slatted screen into the cleaning mechanism 4. By this means a very thorough and complete separation of the valuable particles of the material takes place, while at the same time this separation is accomplished with great rapidity owing to the peculiar construction wherein the material is carried through the machine in uniform, rapid, and constant progress and with no opportunity for choking or clogging.

The outer end of the stacker-tube 22 is provided with a deflecting-hood 29, pivotally connected at 30 to bars 31, projecting from the tube 22, so that the hood may be adjusted as required.

32 is a double-ended arm, one end being connected by a spring 33 to the tube 22, which acts to retain the hood normally nearly in alinement to the body portion of the tube, while the other end of the tube is provided with a wire or cord 34ª, which will lead back to the machine convenient to the hand of the operator.

In Fig. 1 a cord or wire 34 is shown leading from the stacker to a small windlass 35, which will be found to be a convenient means of handling the stacker-tube.

The mechanism by which the stacker 22 is adjusted consists of a large worm-gear 36, attached to the lower end of the tube 22, as by a collar or sleeve 37, the tube 22 being connected to the collar by a hinged joint 38, so that its free outer end may be adjusted vertically. The worm-gear is connected to be actuated by a worm-pinion 36ª, supported in a bracket 36ᵇ on the framework 1, as shown.

Attached to the framework of the machine above the discharge of the fan-casing 20 is a beveled annular ring-gear 39, and engaging this ring-gear are a series of pinions 40, supported by hangers 41, depending from and attached rigidly to the under side of the worm-gear 36. The hangers extend downward below the line of the ring-gear and are provided with rolls 42, bearing upward beneath the ring-gear, as shown. By this means the stacker-spout base is in position to be oscillated by the coaction of the worm-gears in a horizontal plane and be held steadily in position by the gear 39, pinions 40, and bearing-rolls 42, as will be understood.

The fan-casing 20, it will be observed, is formed integral with the framework 1 of the machine, so that the semicylindrical screen 15 and the inclosed casing above it lead directly into the fan-casing. Hence no obstruction is offered to the free passage of the straw to the stacker-fan. Moreover, the fan 21 is attached directly to the same shaft as the curved bars 18 19, which greatly simplifies the construction and requires less power to operate the machine.

What we claim as new is—

1. In a grain-separator, the combination of a horizontally-disposed semicylindrical screen, means to feed material to one end thereof, a fan-casing into which said screen discharges, a revoluble shaft, having beater-arms operative in said screen and a fan in said casing, a stacker-tube susceptible of pivotal movement in a horizontal plane and of angular movement in a vertical plane forming the outlet for said fan-casing, a chaffing-screen, and a chaff-fan having an outlet discharging into the casing of the first-mentioned fan, said outlet being provided with an intake adapted to receive the tailings from the chaffing-screen.

2. In a grain-separator, the combination with a screen curved in cross-section, of a revoluble beater having arms with their inner portions radial and at right angles to the axis of the beater and their outer portions bent rearwardly, curved spirally with reference to the axis of the beater and disposed in planes parallel with the axis of the beater and screen, and concentric with the latter, said arms forming beaters and feeders to throw the material centrifugally against the screen and move the straw longitudinally therethrough, substantially as described.

In testimony that we claim the foregoing as our own we have hereto affixed our signatures in the presence of two witnesses.

CLARENCE B. HIXSON.
CHARLES T. HIXSON.

Witnesses:
E. D. CALDWELL,
OTIS L. PEARCE.